United States Patent [19]
Tanaka et al.

[11] Patent Number: 5,153,879
[45] Date of Patent: Oct. 6, 1992

[54] OPTICAL RECORDING SYSTEM

[75] Inventors: Kunimaro Tanaka; Minoru Ozaki; Yoshihiro Kiyose; Osamu Ito, all of Amagasaki, Japan

[73] Assignee: Mitsubishi Denki Kabushiki Kaisha, Japan

[21] Appl. No.: 496,272

[22] Filed: Mar. 20, 1990

[30] Foreign Application Priority Data

| Mar. 23, 1989 | [JP] | Japan | 1-73117 |
| Apr. 14, 1989 | [JP] | Japan | 1-95677 |
| May 26, 1989 | [JP] | Japan | 1-133204 |
| May 26, 1989 | [JP] | Japan | 1-133205 |

[51] Int. Cl.⁵ .......................... G06F 11/06; G11B 5/76
[52] U.S. Cl. ........................................ 371/2.1; 369/59
[58] Field of Search ................... 371/10.1, 39.1, 2.1, 371/40.1; 369/59

[56] References Cited

PUBLICATIONS

*A Case for Redundant Arrays of Inexpensive Disks* (*RAID*) by D. A. Patterson et al., Report No. UCB/CSD 87/391, Dec. 1987, Computer Science Division, University of California, Berkley, Calif.

*Primary Examiner*—Vincent P. Canney
*Attorney, Agent, or Firm*—Wolf, Greenfield, Sacks

[57] ABSTRACT

An optical recording system separates and records data on optical disks that are loaded on respective optical disk drives. On each optional disk, information identifying the disk is recorded so that the optical disk may be loaded arbitrarily into any of the optical disk drives. Each optical disk may also include check symbols for data that are recorded to enable data on defective optical disk to be properly reproduced.

3 Claims, 18 Drawing Sheets

Fig. 13

| OPTICAL DISK ① | FIRST BLOCK | $a_1$ |
|---|---|---|
| OPTICAL DISK ② | SECOND BLOCK | $a_2$ |
| OPTICAL DISK ③ | THIRD BLOCK | $a_3$ |
| OPTICAL DISK ④ | FOURTH BLOCK | $a_4$ |
| OPTICAL DISK ⑤ | FIFTH BLOCK | $a_5$ |
| OPTICAL DISK ⑥ | SIXTH BLOCK | $a_6$ |
| OPTICAL DISK ⑦ | SEVENTH BLOCK | $a_7$ |
| OPTICAL DISK ⑧ | EIGHTH BLOCK | $a_8$ |
| OPTICAL DISK ⑨ | P | $a_9$ |
| OPTICAL DISK ⑩ | Q | $a_{10}$ |
| OPTICAL DISK ⑪ | R | $a_{11}$ |
| OPTICAL DISK ⑫ | S | $a_{12}$ |

The a-th Access

The b-th Access

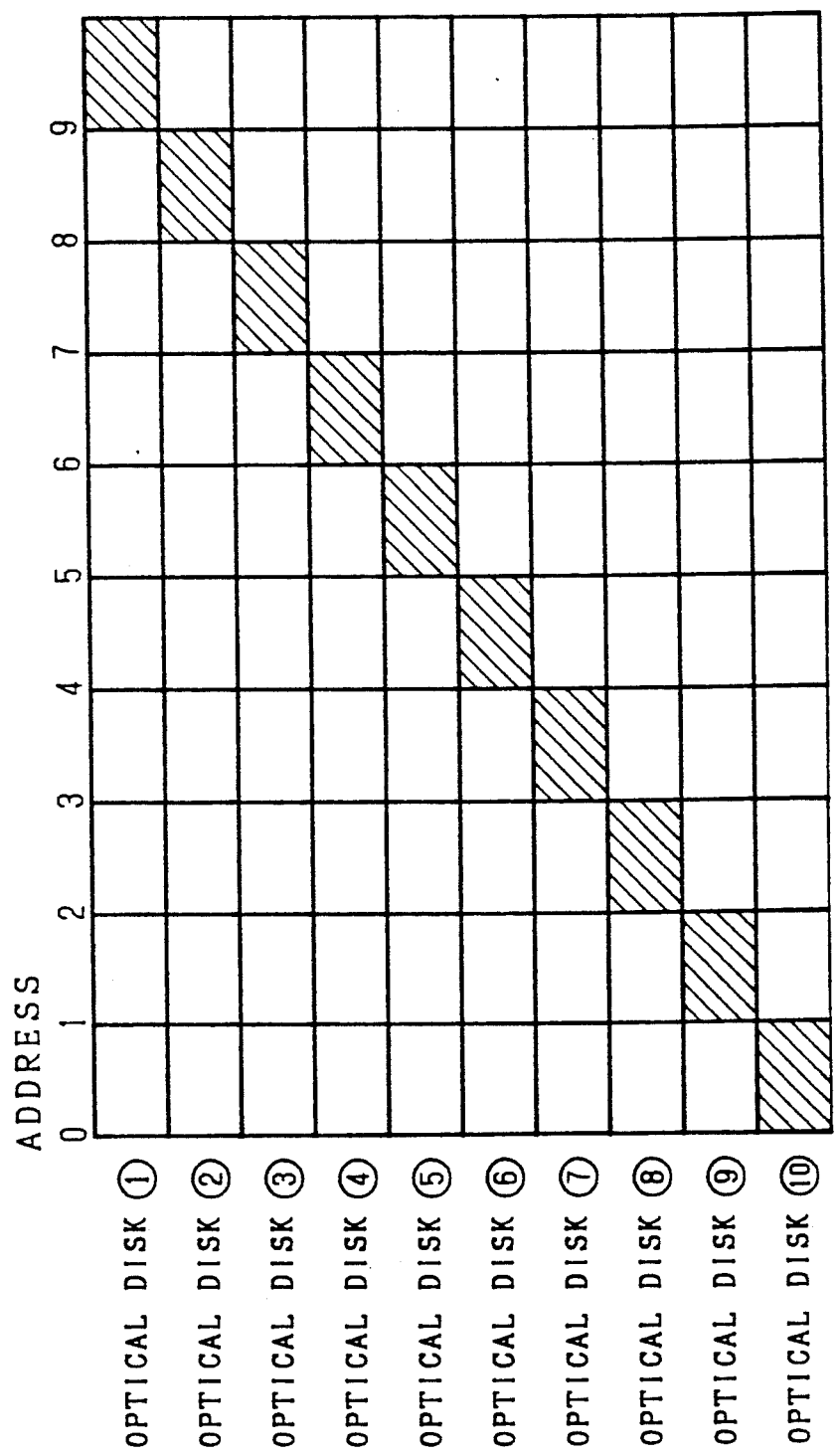

OPTICAL RECORDING SYSTEM

BACKGROUND OF THE INVENTION

1. Field of the Invention

The present invention relates to an optical recording system using optical disks (including opto magnetic disks) as a recording medium.

2. Description of Related Art

Some magnetic disks have realized high-speed transmission rates by synchronously rotating a plurality of disk drives. For example, a system is shown in the Nikkei Electronics, page 48, Dec. 28, 1987.

On the other hand, the optical disk has been put in practical use as a large-capacity information recording medium. An array-type optical recording system is under development wherein to utilize the characteristics of this disk more effectively, a plurality of disk drives are combined, and are operated just like one large capacity disk driving system.

In the conventional optical recording system, a diversity of utilizations are made possible by making the optical disk changeable, or loadable/unloadable.

However, making the optical disk changeable is accompanied by the following problems.

Where a configuration is adopted, having an optical disk and an optical disk drive, wherein the disk and optical disk drive are set so as to correspond to each other and the optical disk is loaded in another optical disk drive by mistake, the expected operation is not performed.

There is a possibility of losing an optical disk. The possibility of a breakage of an optical disk is remarkably high.

Furthermore, because of using a plurality of optical disks, physical defects of the respective disks sometimes concentrate on a specific position. This means that if a master disk or stamper has a defect, replicas fabricated by this stamper have the same defect.

SUMMARY OF THE INVENTION

The present invention has been achieved to eliminate such problems. A first objective of the present invention is to provide an optical recording system and optical disk wherein on each optical disk, peculiar information identifying itself is recorded, and by means of information constitution of each optical disk, an optical disk and a disk drive thereof are made to correspond to each other by a controlling apparatus, and the system can operate without trouble even if each optical disk is loaded in any optical disk drive.

An optical recording system for attaining this objective comprises a plurality of optical disk drives, a plurality of optical disks to be loaded in a loadable/unloadable or changeable manner in the above-mentioned disk drives, and a controlling apparatus controlling record and reproduction of data for the optical disks loaded in the above-mentioned optical disk drives, and is characterized by that peculiar information identifying itself is recorded on the above-mentioned optical disk. The above-mentioned controlling apparatus comprises means for reading the above-mentioned information and means for identifying the optical disk drive being loaded the optical disk for record or reproduction of data based on the above-mentioned information.

The optical disk to be used is recorded with peculiar information identifying itself as described above.

This system adopts a configuration wherein some of a plurality of optical disks are used only for recording check symbols of an error correct code calculated with a combination of a part of the information respectively recorded in the other optical disks.

A controlling apparatus in the present invention detects the above-mentioned information from the optical disks loaded in a plurality of optical disk drives and processes it, and thereby controls recording and reproduction. Accordingly, the system can be operated without trouble even if any of the optical disks is loaded in any of the optical disk drives. Furthermore, when some of the optical disks are used for recording check symbols of an error correct code, the other disks are not required to provide alternate sectors or alternate tracks, and therefore defect management is facilitated.

A second objective of the present invention is to provide an optical recording system wherein data is separated and recorded on a plurality of optical disks and check symbols of an error correct code are recorded on some of the optical disks, and thereby the system can be operated without trouble even if a loss or breakage of some optical disk or if there is trouble with an optical disk drive, and the duty at re-write is light.

An optical recording system for attaining this objective comprises a plurality of optical disk drives wherein an optical disk is loaded respectively, means for dividing data to be recorded into meaningful blocks and for separating and recording each data block on a plurality of optical disks, means for making check symbols of an error correct code for the corresponding portion of data to be recorded on each optical disk, and means for recording the above-mentioned check symbols on the other optical disks.

Each data block is separated and recorded on a plurality of optical disks, and, for example, check symbols are made for the data recorded on the same sector, and the check symbols are recorded on the same sectors of the above-mentioned other optical disks.

When data is re-written, re-write of a data block comprising that data is performed on the optical disk where the above-mentioned data block is recorded and re-write of the corresponding check symbols is performed on said other optical disk.

When a loss of any of the optical disks or a destruction of data takes place, the data can be restored or reproduced by using the check symbols.

The hamming distance n of the error correct code is preferably set to $n \geq 3$, and these check symbols are recorded on $(n-1)$ sheets of specific optical disks.

Then, in the case of $n=3$, the recorded data can be reproduced even if one optical disk or one disk drive has trouble.

In the case of $n=5$, the recorded data can be reproduced even if two optical disks or two disk drives have trouble.

Where additional information such as erasure information exists, the system can accommodate for more than the above-mentioned troubles.

A third objective of the present invention is to provide an optical recording system wherein in recording on a plurality of optical disks, the physical address where data is to be recorded is made to differ in each optical disk, and thereby no trouble takes place even if data is recorded on a plural number of optical disks having defects in a specific physical address. Troubles caused by a trouble of the master disk of the optical disk or the stamper appears at the same physical address.

Accordingly, when data is separated and recorded at different physical addresses, the error mixed into the scatter-recorded data is limited to that of one disk, and accordingly, it is made possible to correct that error by a proper method.

The above and further objects and features of the invention will more fully be apparent from the following detailed description with accompanying drawings.

BRIEF DESCRIPTION OF THE DRAWINGS

FIG. 13 is an explanatory drawing of a recording system of the same, FIG. 17 is an explanatory drawing of still another data separating and recording system.

DESCRIPTION OF THE PREFERRED EMBODIMENTS

Hereinafter, detailed description is made on the present invention based on drawings showing embodiments thereof.

Figure 1:
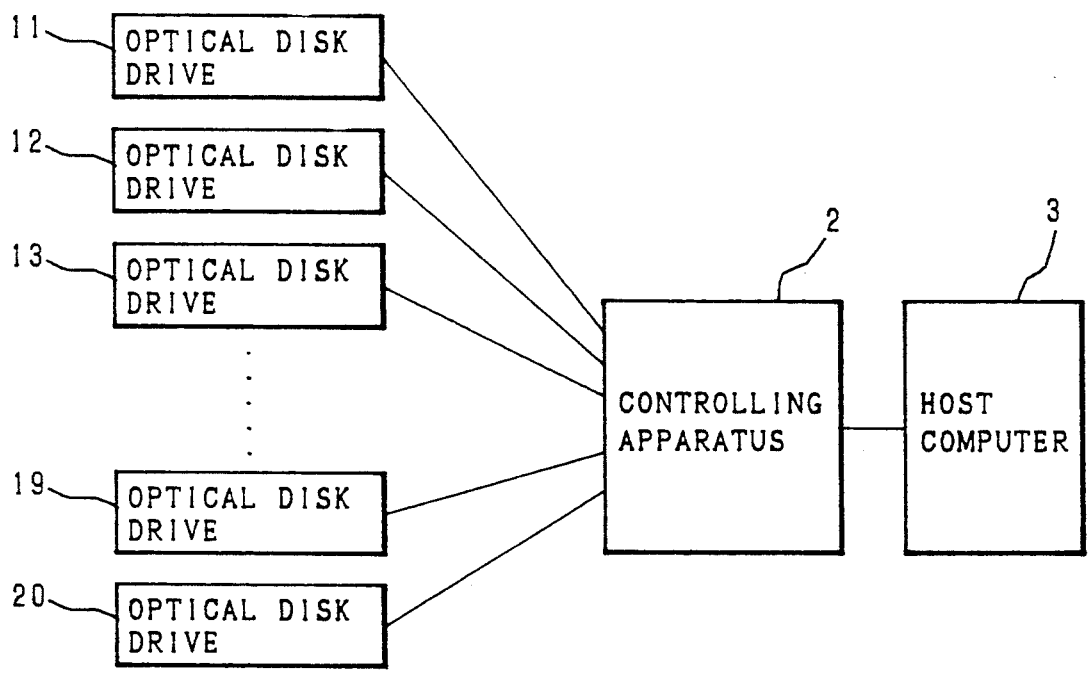
FIG. 1 is a block diagram of a first embodiment of an optical recording system of the present invention.

FIG. 1 is a block diagram of an embodiment of an optical recording system of the present invention.

In FIG. 1, numerals 11, 12. . . 20 designate optical disk drives, which record data given from a controlling apparatus 2 on optical disks, or reproduce the data recorded on the optical disks. Numeral 3 designates a host computer, which gives data to be recorded to the controlling apparatus 2, or directs reproduction of the data.

Figure 2:
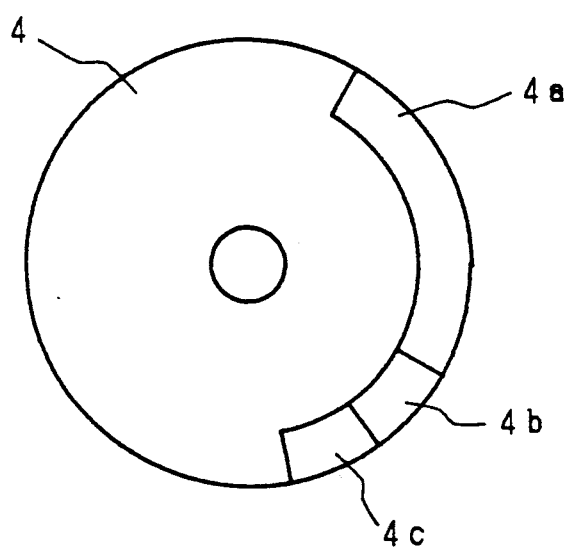
FIG. 2 is an explanatory drawing of a format of an optical disk.

FIG. 2 shows an abstract of a record format of an optical disk 4, which is provided with a file name recording area 4a for recording information identifying a data file constituted with recorded data, a number recording area 4b for recording the identifying number of optical disk and a record form identifying area 4c.

The method of numbering the optical disk may be a method wherein the same number exists by only one in the whole system, or may be a method wherein the same number exists in a plural number.

In the record form identifying area 4c, whether the whole recording area of the disk is used for recording or part of the recording area is used for recording, that is, whether the optical disk is used as a large-capacity recording medium by using the whole recording area though the speed of record or reproduction is low, or, in reverse, the optical disk is used as a small-capacity recording medium by using a specific part of the area though the speed of record or reproduction is high, is recorded.

In the optical disk recording, by recording data on the whole surface of the disk, the recording capacity per one sheet becomes large, but all tracks are required to be sought, and the seeking time becomes long. On the other hand, where only part of the tracks are used, the distance of seeking becomes short, and therefore the seeking time becomes short although the recording capacity per one sheet becomes small. Codes for identifying these recording modes are recorded in the record form identifying area 4c.

Then, in this system, on the optical disk whereon specific numbers, for example, 9 and 10 are recorded in the number recording area 4b, only check data produced from the data recorded on the other optical disks, that is, only check symbols of an error correct code are recorded.

Operation of the optical recording system of the present invention as described above is as follows. The operation differs depending on whether or not the file name recording area 4a, the number recording area 4b and the record form identifying area 4c are recorded in advance. Where these areas 4a–4c are not recorded in advance, an ID part is recorded in formatting the optical disk. The ID part is information identifying a plurality of sets of optical disks, and the record thereof is performed, for example, at the file name recording area 4a. Description is made assuming that the ID part is already recorded. First, before starting the system, the optical disks 4 are loaded in the optical disk drives 11, 12 . . . . In this case, any of the optical disks may be loaded in any of the optical disk drives 11, 12 . . . . By starting the system, the controlling apparatus 2 reads the contents of the file name recording area 4a, the number recording area 4b and the record form identifying area 4c. The host computer 3 judges whether or not the optical disk matching with the purpose of the use has been selected and loaded by examing the contents of the file name recording area 4a.

On the other hand, from the content of the number recording area 4b, the controlling apparatus 2 judges which number of optical disk 4 has been loaded in which of the optical disk drives 11, 12 . . . .

Figure 3:
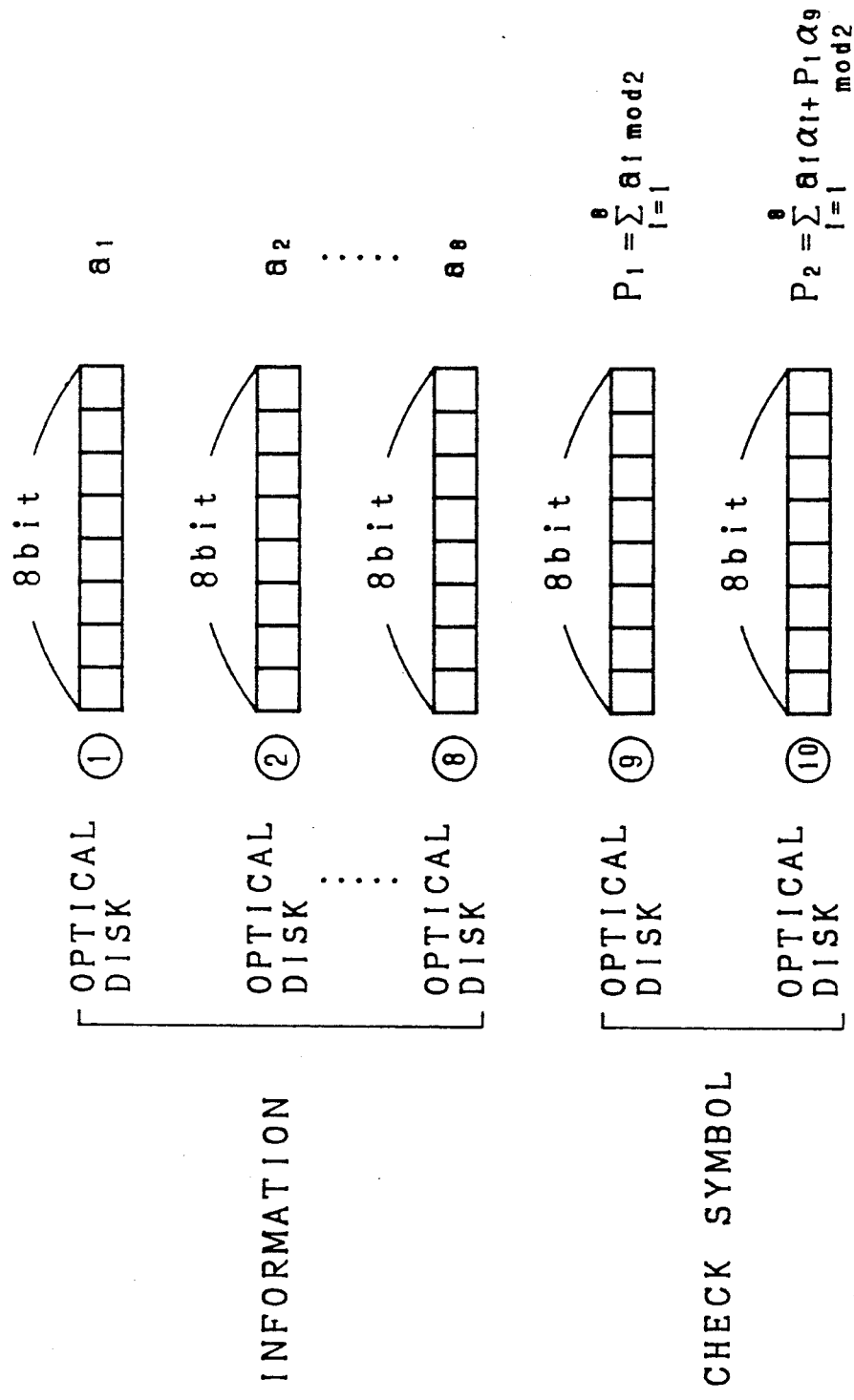
FIG. 3 is an explanatory drawing of check symbols.

In addition, as described later, based on the rule of producing check symbols of an error correct code and the check symbols reproduced from the optical disk, the optical disk loaded in each of the optical disk drives 11, 12, . . . can be identified. Where 10 units of optical disk drives are installed as is the case with this embodiment, eight units are assigned to the disk drives for recording and reproducing information, and two units are assigned to the disk drives for recording and reproducing check symbols. Note that the disk drives for recording and reproducing information and check symbols are not installed in a fixed manner, but can operate as a drive for information or operate as a drive for check symbols depending on the disk loaded therein. An error correcting method using Reed-Solomon code is known (see FIG. 3). This means that eight bits of data recorded on each of the optical disks of No. 1–No. 8 are taken as one unit, and this is represented as $a_i$ ($i=1-8$), and an element of GF ($2^8$) is represented as $\alpha_i$, and the following parities $P_1$ and $P_2$ are calculated.

$$P_1 = \sum_{i=1}^{8} a_i \bmod 2 \quad (1)$$

$$P_2 = \sum_{i=1}^{8} a_i \alpha_i + P_1 \alpha_9 \bmod 2 \quad (2)$$

These $P_1$ and $P_2$ are recorded on the optical disks of No. 9 and No. 10, respectively. This means that the check symbols $P_1$ and $P_2$ of this error correct code are constituted across a plurality of optical disks, and the hamming distance between them is 3. In other words, two optical disks are installed for recording the check symbols $P_1$ and $P_2$, respectively.

Correspondence between the disk drive performing record or reproduction and the optical disk can be identified also by this error correction. That is, it is assumed that in the stage that the optical disk is loaded, each optical disk is loaded in each optical disk drive set in advance. Next, a power of $\alpha$ is made based on the assumed relationship between the optical disk and the optical disk drive, and thereby error correction (as described later) is made. However, where the loaded state of the actual optical disk differs from that of the assumed one, error correction cannot be made, and syndromes are set. When the syndromes are set, another loaded state is assumed, and error correction is made again. Thus, the assumption of the loaded state is sequentially changed, and the same processing is repeated until the correct state is encountered. Thus, the correct loaded state of the optical disk can be found. By doing in such a manner, the number of the optical disk can be identified without installing the number recording area 4b.

Figure 4:
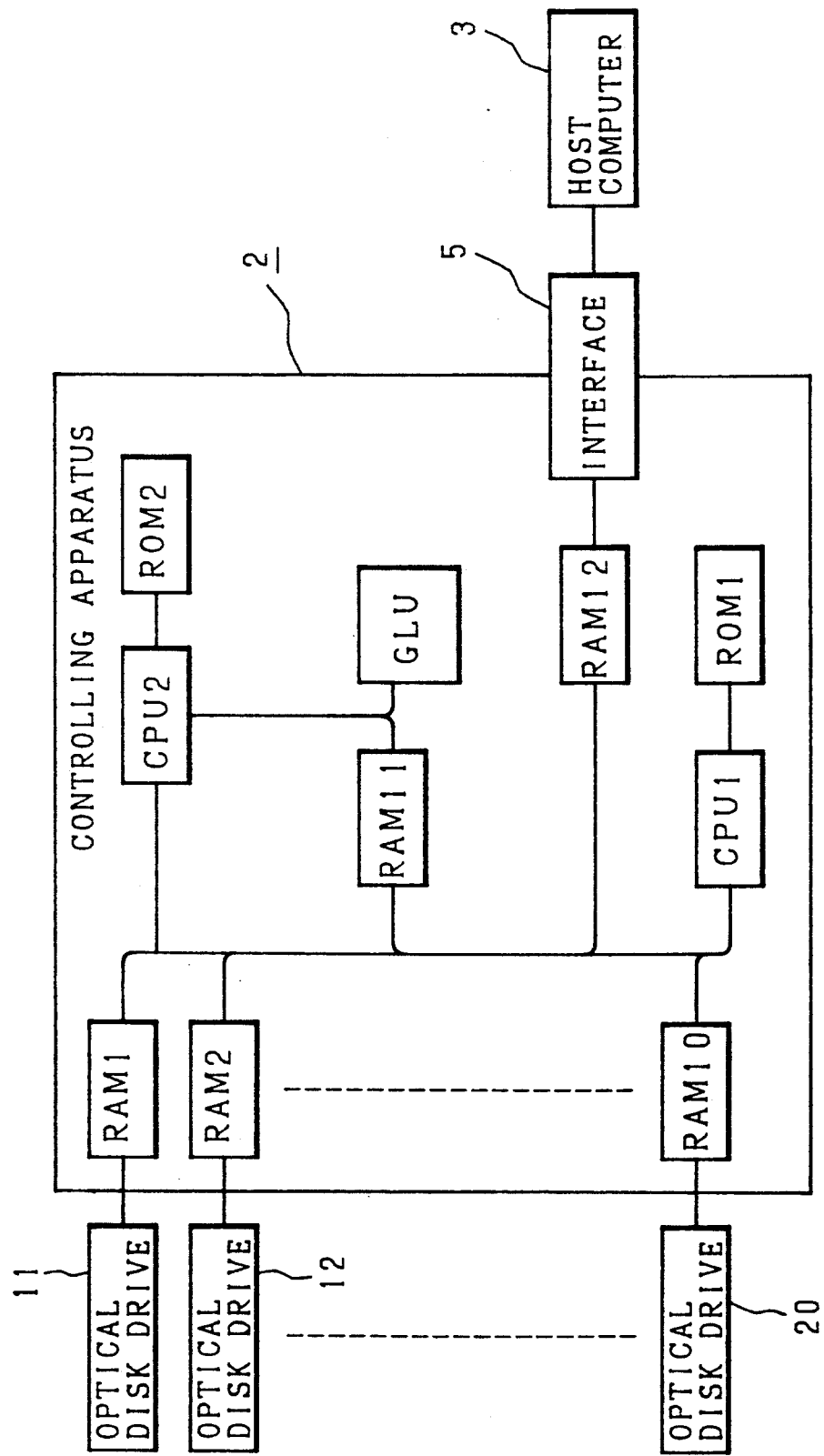
FIG. 4 is a block diagram of a controlling apparatus, FIG. 5 6(a), (b), 7(a) and (b) are explanatory drawings of data separating and recording.

FIG. 4 is a block diagram showing an example of the controlling apparatus 2. The controlling apparatus 2 is provided with buffer RAMs (RAM 1, RAM 2, ... RAM 10) for the respective optical disk drive, and data to be recorded by the respective optical disk drives 11, 12 ... are stored once here, and are thereafter transferred to the respective optical disk drives, and in reproduction, the data reproduced by the respective optical disk drives 11, 12 ... are stored once here.

Encoding and decoding of the error correction code are performed by another RAM (RAM 11), a central processing unit CPU 2, a read-only memory ROM 2 and a Galois logic unit GLU. Data to be encoded and decoded are stored in the RAM 11 once, thereafter being used by the Galois logic unit GLU. Control of the operation is performed by the central processing unit CPU 2.

The firmware for control and the power of $\alpha$ are stored in advance in the read-only memory (ROM) 2. Sending and receiving of data to and from the host computer 3 are performed through an interface 5. Data from the host computer 3 is stored once in another RAM (RAM 12), and is subsequently transferred to a RAM 11. Conversely, when the reproduced data is transferred to the host computer 3, the data is stored once, and subsequently transferred to the host computer 3. These controls are performed by another central controlling unit CPU 1, and the firmware for these controls is stored in advance in a read-only memory ROM 1.

In the system of the present invention as described above, where the data given from the host computer 3 is recorded, the controlling apparatus 2 adds the check data to the data inputted from the host computer 3 using the central processing unit CPU 2, RAM 11 and the Galois logic unit GLU, sends the data to the optical disk drives 11, 12 ..., and sends out control signals required for controlling the optical disk drives 11, 12 .... At this time, identifying of the optical disk drive whereto the data is to be sent is made by the recorded data in the number recording area 4b or the above-described method of repeating error correction.

The optical disk drives 11, 12 ... record the data sent out in such a manner on the optical disks thereof.

On the other hand, in reproduction, according to the direction from the host computer 3, the controlling unit 2 sends a signal directing reproduction and a signal of the physical address or a logical address of the position where the data to be reproduced is recorded to the optical disk drives 11, 12 ... wherein the appropriate optical disks 4 are loaded. Thereby, the required data is reproduced.

Next, description is made on the data recording system of the system of the present invention in contrast with the conventional system. In the conventional optical disk, each block of data is recorded in a predetermined sector, and thereafter this is reproduced for a data check. Where the difference between the data to be recorded and the reproduced data exceeds a predetermined criterion, the data is recorded again in a reserved sector provided for each track, that is, an alternate sector. The record into this alternate sector is reproduced and checked again, and where many errors exist also in this record, the data is recorded further again into another reserved track, that is, an alternate track.

On the other hand, in the system of the present invention, the check data is recorded in one or a plurality of specific optical disks, and it is possible not to reserve the above-described alternate sector, alternate track or the like.

Figure 5:
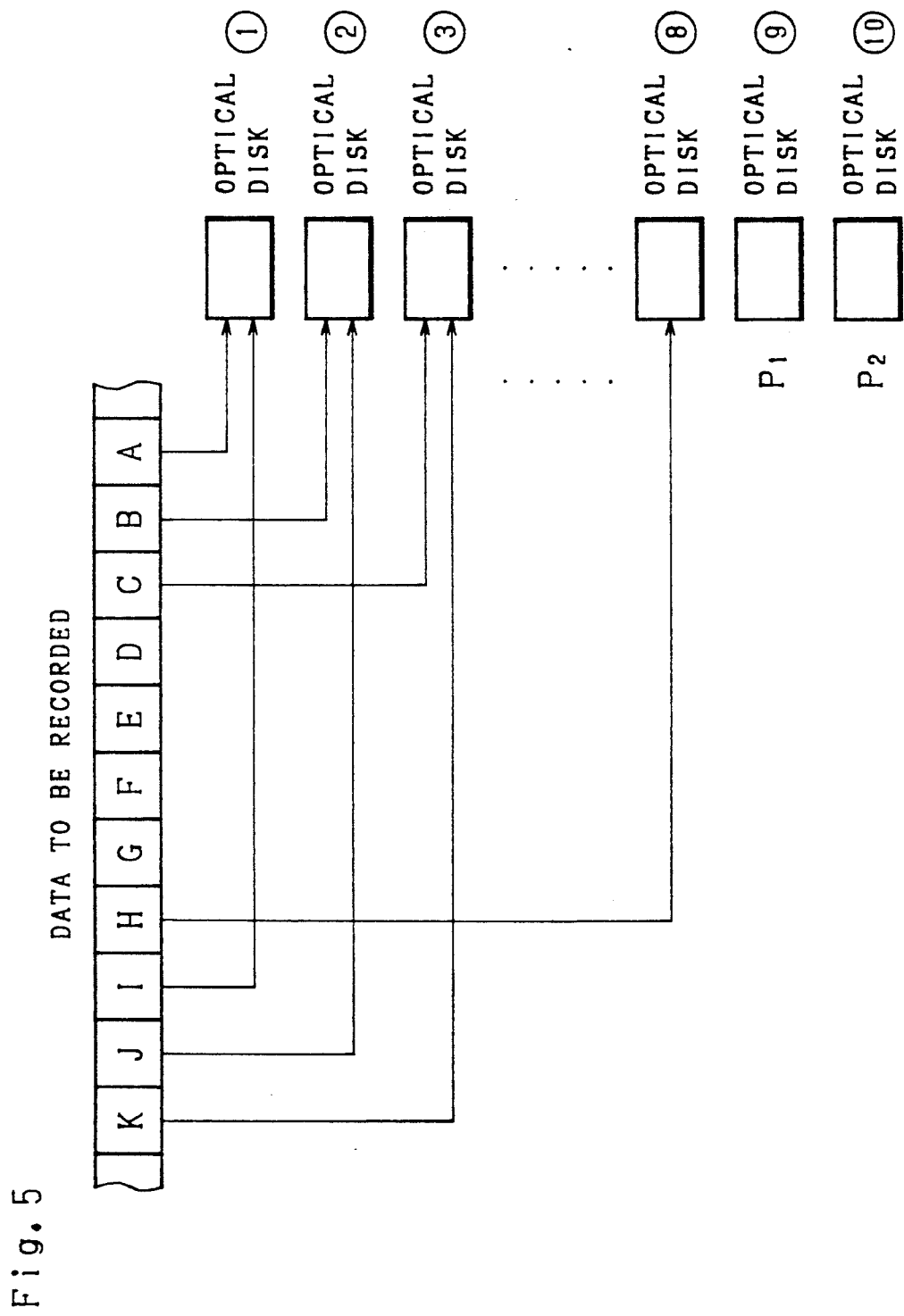

FIG. 5 is an explanatory drawing of the recording system of data in the optical recording system of the present invention. Data to be recorded is divided into data blocks A, B, C ... J, K ..., each of which has a meaning in itself. Processing is facilitated by setting the data lengths equal, but the length is not limited to being equal. One data block is set equal to or shorter than the data length (760 bytes) which can be recorded in one sector of the optical disk. Then, the data blocks A, B, C ... G, H are recorded at the same address of each of the optical disks ①, ②, ③ ... ⑦, ⑧, and for these data blocks, A, B, C ... G, H, the check symbols $P_1$ and $P_2$ are made for every eight bits as described above, being recorded in the same address of each of the optical disks ⑨ and ⑩. Similarly, the next-order data blocks J, K ... are recorded in a same manner on the disks ①-⑧, and the check symbols thereof are recorded on the optical disks 9 and ⑩.

Figure 6:
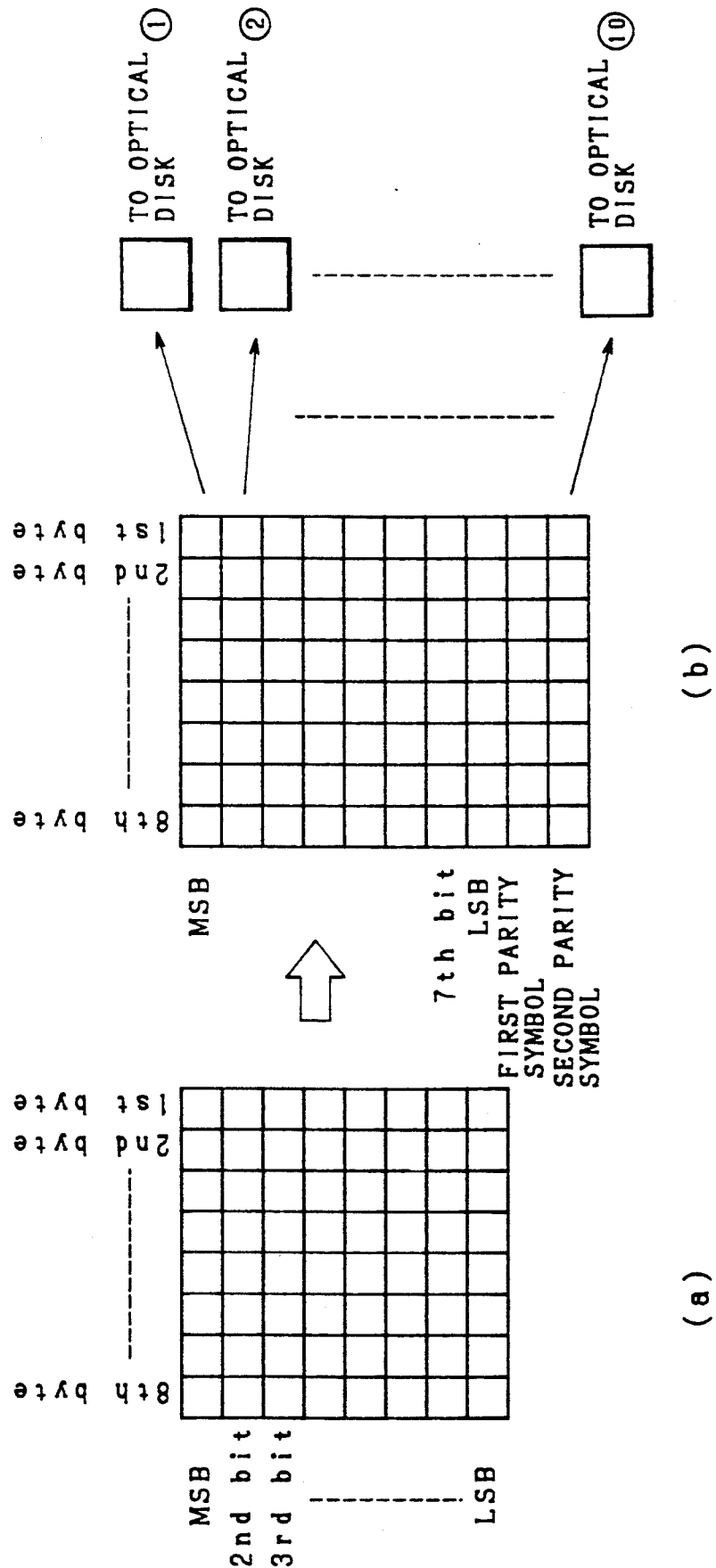

FIG. 6 shows an example of a recording system which interleaves eight bytes of data taken as a record unit. As shown in FIG. 6(a), it is assumed that data of eight bits (one byte), MSB-LSB exist from the first byte to the eighth byte. Then, as shown in FIG. 6(b), two parity symbols (the first parity symbol and the second parity symbol) are generated on a byte basis. These symbols are generated based on the above-mentioned equations (1) and (2). All of MSBs of these first-eighth bytes are sent to the optical disk drive wherein the optical disk ① is loaded. All of data of the second bits of the first-eighth bytes are sent simultaneously to the optical disk drive wherein the optical disk ② is loaded.

Subsequently, like the above, data of the first-eighth bytes are sent to the remaining optical disk drives and loaded.

Then, each piece of data of eight bits of the first parity symbol and the second parity symbol is sent to the optical disk drives ⑨ or ⑩ and loaded. The data sent to each optical disk drive is recorded on the optical disk loaded therein, respectively. The recording onto each optical disk may be performed at the same address or at, a different address. The record address is described later.

Figure 7:
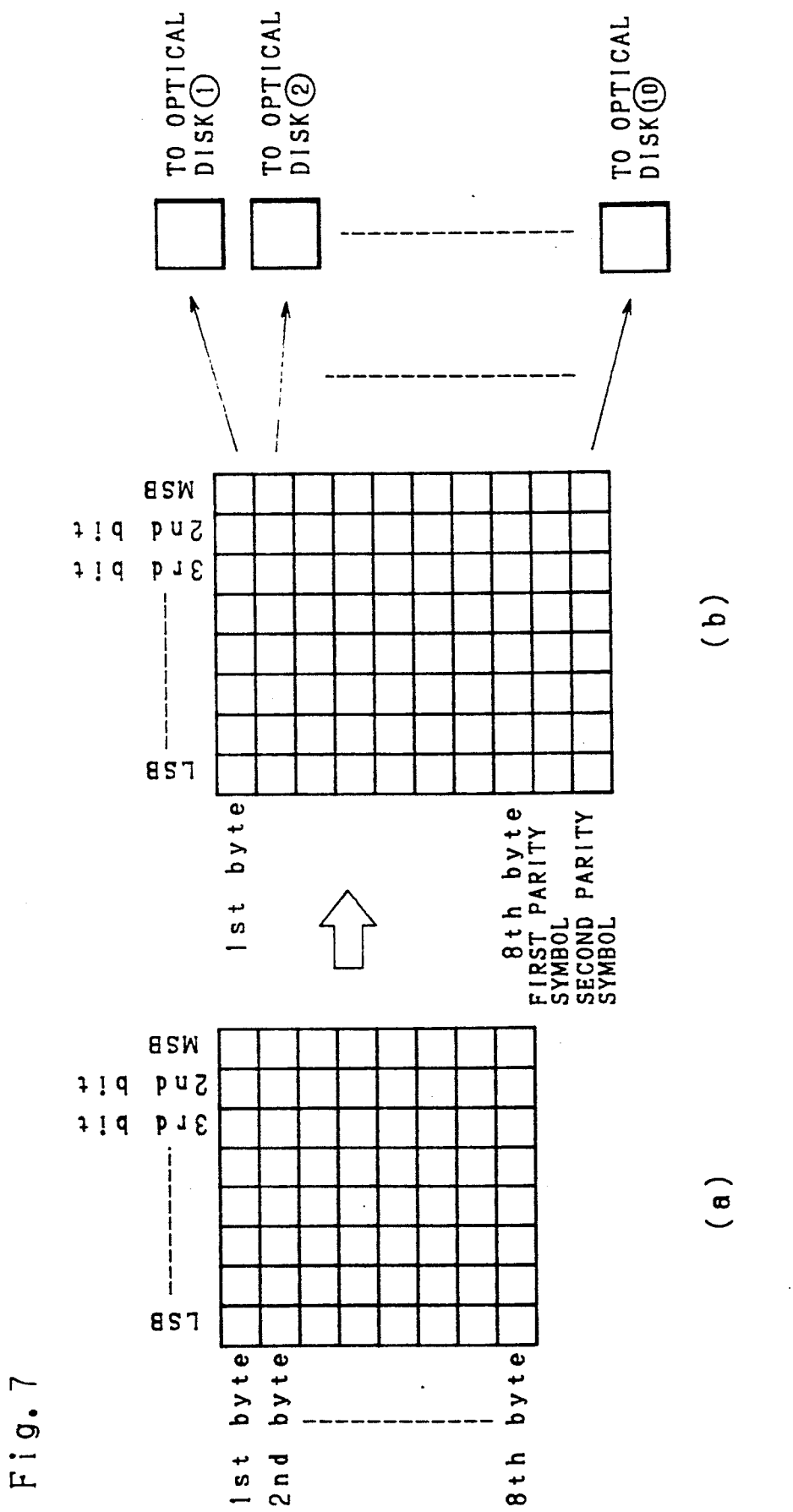

FIG. 7 shows an example of another embodiment of the recording system of the present invention, and as shown in FIG. 7(b), the first parity symbol and the second parity symbol are made from all bytes, and subsequently the first byte is sent to the optical disk drive loaded the optical disk ①, the second byte is sent to the optical disk drive loaded the optical disk ②. The first parity symbol is sent to the optical disk drive loaded on optical disk ⑨, and the second parity symbol is sent to the optical disk drive loaded on optical disk ⑩. Needless to say, each of the bytes and symbols is recorded on each optical disk in each disk drive.

Figure 8:
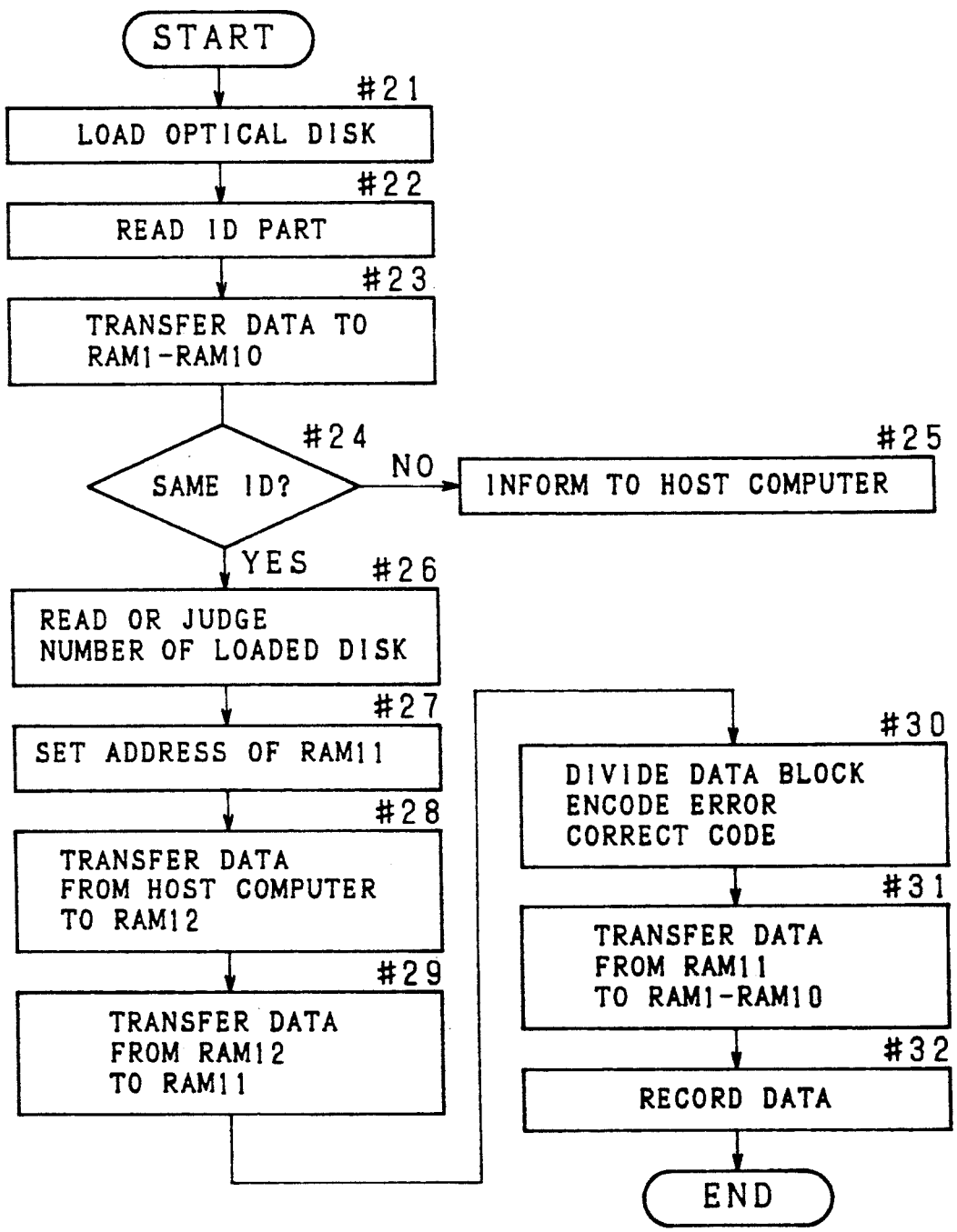
FIG. 8 is a flow chart of processing procedures in recording data.

FIG. 8 is a flow chart of processing procedure in data recording. When the optical disks are loaded (#21) and the optical disk drives 11, 12 . . . are started up, first, a read of the ID part by the respective disk drives 11, 12 . . . is performed (#22). The read data are transferred to the RAM1-10 (#23). The central processing unit CPU 1 checks this ID part (#24), and in the case that the IDs are not the same, the CPU informs the host computer 3 of this (#25). In the case of the same, the CPU reads or judges the number of the optical disk loaded in each of the optical disk drives 11, 12 . . . (#26).

Figure 9:
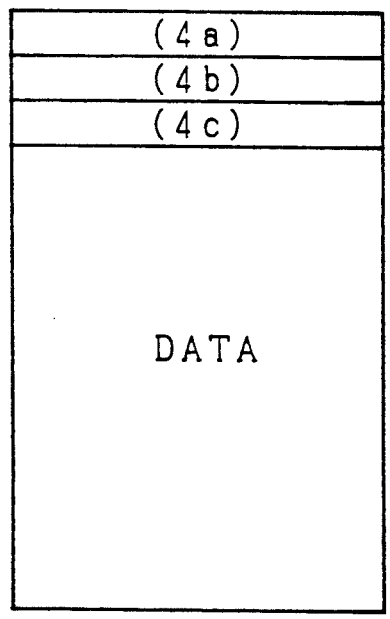
FIG. 9 is a memory map of RAM 1 through RAM 10.

FIG. 9 is a drawing showing a data storing area of each of the RAM 1-RAM 10. Besides the area for storing data, areas for storing identification data read from the file name recording area 4a, the number recording area 4b and the record form identifying area 4c are installed (in the drawing, 4a, 4b, and 4c are affixed). At the point when the optical disk is loaded, the optical disk drive reproduces the identification data, and transfers it to the RAM 1-RAM 10. The central processing unit CPU 1 reads the identification data stored in the identification data areas in the RAM 1-RAM 10, and judges that which optical disk has been loaded in which optical disk drive.

Data to be recorded on the optical disks loaded in 10 optical disk drives 11, 12 . . . are stored once in the RAM 11, and then divided as described above, and the check symbols are calculated and moved to the RAM 1-RAM 10. The RAM 1-RAM 10 are allocated to 10 optical disk drives, respectively. On the other hand, storage in the RAM 11 is performed according to addresses allocated to the 10 optical disks. Accordingly, when the optical disk loaded in each optical disk drive is identified, the address of the RAM 11 storing the data to be transferred to the respective RAM 1-RAM 10 is set (#27). After this setting, the data to be recorded from the host computer 3 is transferred to the RAM 12 (#28). Further, this is transferred to the RAM 11 (#29), and the data block is divided using the central processing unit CPU 2, and the error correct code is encoded for the data stored in the RAM 11 using the Galois logic unit GLU and the central processing unit CPU 2 (#30). Then, according to the address previously set, the data of the RAM 11 is transferred to the respective RAM 1-RAM 10 (#31). The data is transferred from the respective RAM 1-RAM 10 to the optical disk drives 11, 12 . . . , and is recorded in the data areas of optical disks 4 loaded in the respective disk drives.

On the other hand, in reproduction, the original data is restored by the procedure reverse to the procedure of record as described above. This means that the data reproduced from the respective optical disk drives are arranged in association with the number of the optical disk loaded in each disk drive, and thereby the original data is obtained. Where the interleaving processing of the recording system in FIG. 6 or FIG. 7 is performed, the original data is obtained by the reverse logic. Then, in this data restoration, error correction by the Reed-Solomon code on GF ($2^8$) is performed.

Figure 10:
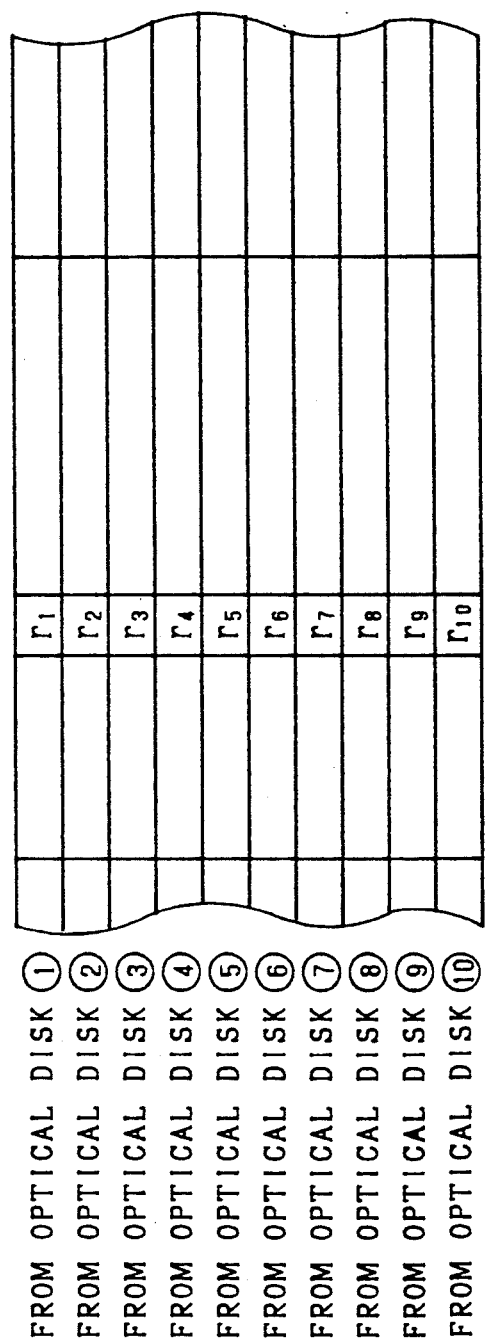
FIG. 10 is an explanatory drawing of reproduced data.

This means that, as shown in FIG. 10, taking data reproduced from the optical disks of the numbers 1, 2 . . . 9, 10 as $r_1, r_2, \ldots r_9, r_{10}$, syndromes $S_0, S_1$ are calculated from the following equations.

$$S_0 = \sum_{i=1}^{9} r_i$$

$$S_1 = \sum_{i=1}^{9} r_i a_i \quad (a_{10} = 1)$$

Where no error exists, $S_0 = S_1 = 0$ holds because of $r_i = a_i$, but where an error exists on the i-th optical disk, $S_0 = 0$ does not hold, and $S_0 = e_i$ holds. Accordingly, when $S_1/S_0 = a_i$ is evaluated, since this $a_i$ is a value peculiar to each optical disk, identifying and error correction of the appropriate optical disk can be performed. In addition, where $a_i$ is a value other than the value allocated to each optical disk, it is assumed that errors are generated simultaneously on two or more optical disks, and error correction is not performed, and only a simultaneous generation of errors is detected. In addition, in this case, when one optical disk can be identified by an error pointer, erasure or the like, identification of the other optical disk, accordingly, error correction of the both optical disks can be performed.

Figure 11:
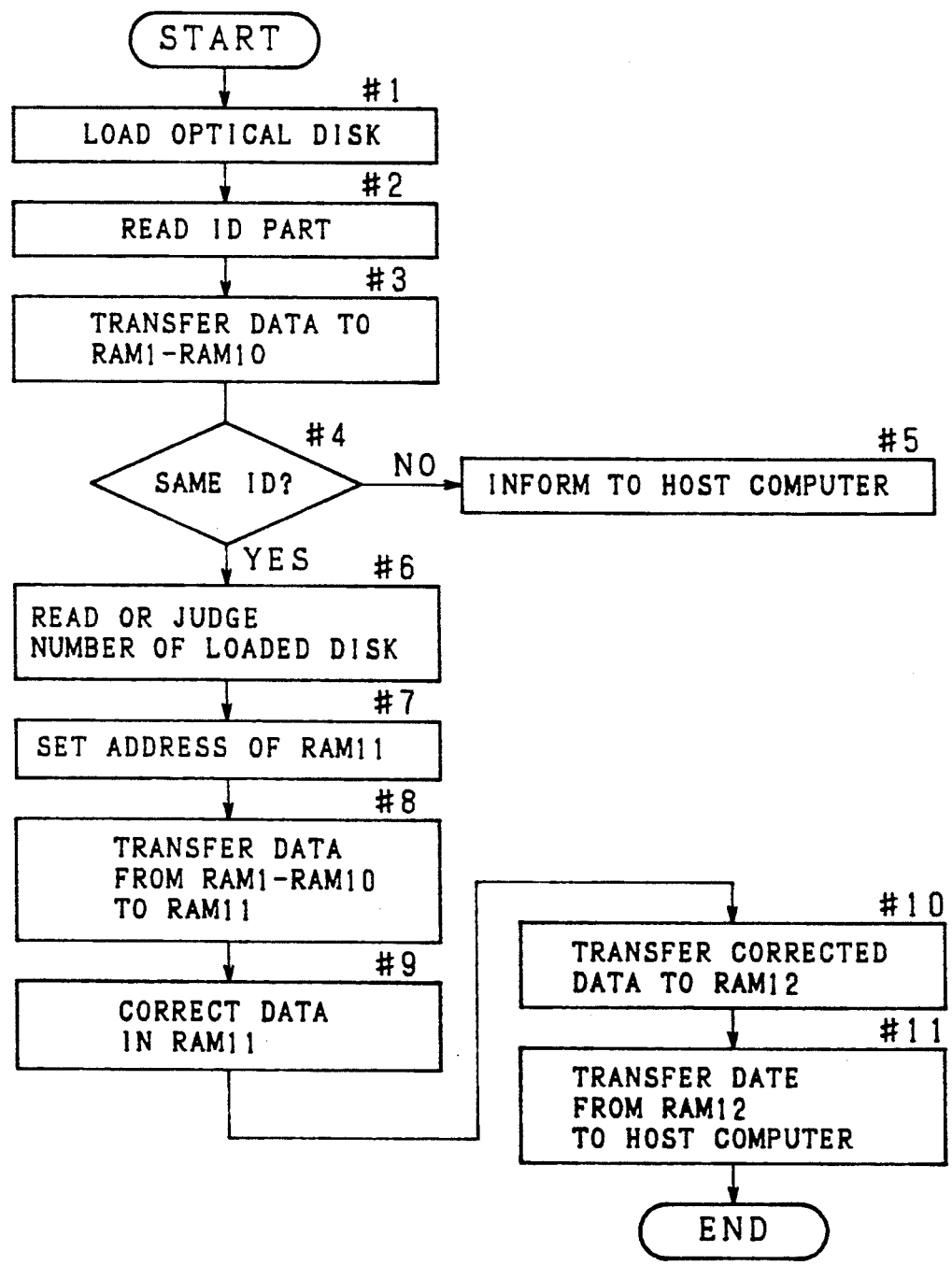
FIG. 11 is a flow chart showing processing procedures of data reproduction error correction.

FIG. 11 is a flow chart showing processing procedures of reproduction and error correction. When the optical disks 4 are loaded (#1), and the optical disk drives 11, 12 . . . are driven, first, the ID part by the respective disk drives 11, 12 . . . are read (#2). The ID parts are transferred to the RAM 1-RAM 10 (#3). The central processing unit CPU 1 checks this ID part (#4), and in the case of not being the same, the CPU performs the host computer 3 of the mismatch (#5). In the case of being the same, the CPU reads or judges the numbers of the optical disks 4 loaded in the respective optical disk drives 11, 12 . . . (#6). Data read from the optical disk drives 11, 12 . . . are stored respectively in the predetermined RAM 1-RAM 10, and the data stored in RAM 1-RAM 10 are transferred to and stored in each area of the RAM 11 allocated responding to the number of the optical disk. In Step #7, address setting for this purpose is performed. After such processing, the data reproduced by the respective optical disk drives 11, 12 . . . are stored once in the RAM 1-RAM 10, being transferred from here to the set address of the RAM 11 (#8). Then, the calculation as described above is performed by the central processing unit CPU 2 and the Galois logic unit GLU, and when an error exists, correction thereof is performed (#9). Then, the corrected data or correct data is transferred to the RAM 12 (#10), being further transferred to the host computer 3 through the interface 5 (#11).

Figure 12:
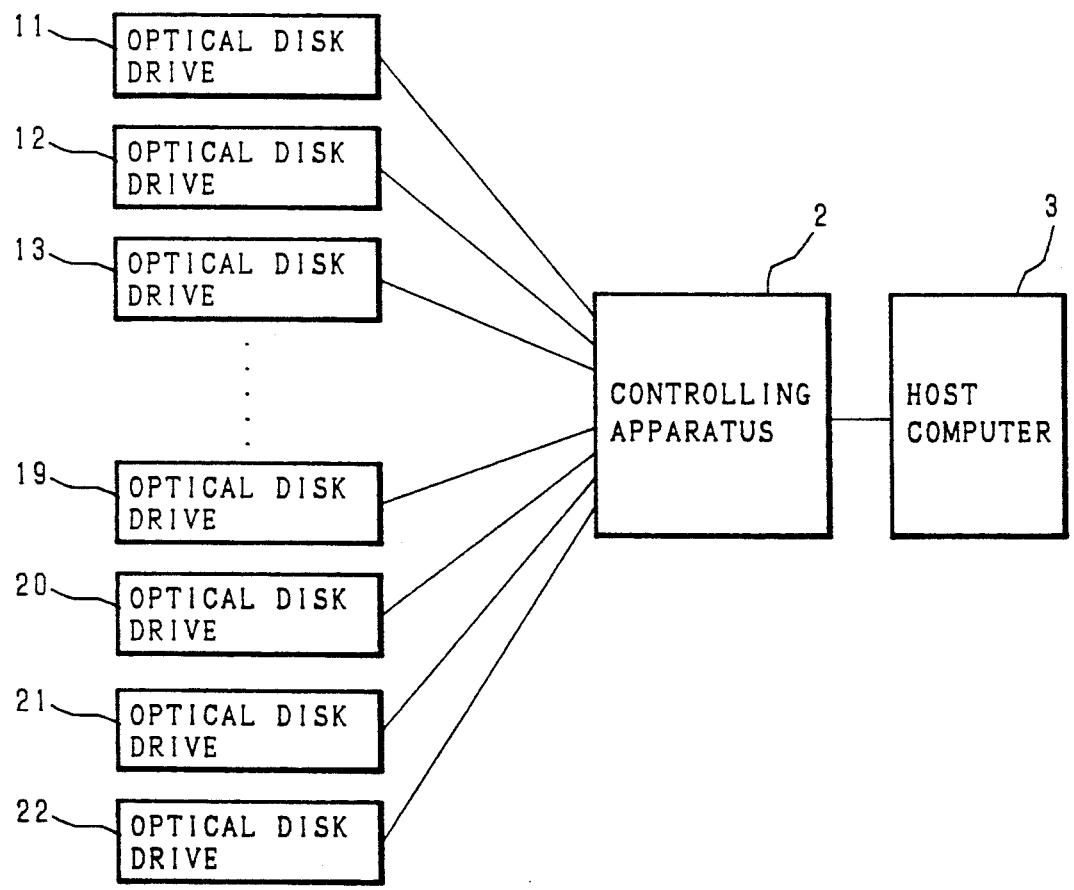
FIG. 12 is a block diagram of a second embodiment of the optical recording system of the present invention.

FIG. 12 shows another embodiment of the present invention, which is provided with 12 optical disk drives 11, 12, 13 ... 19, 20, 21, 22, and uses the ninth, tenth, eleventh and twelfth optical disks for recording check symbols of an error correction code. For example, as shown in FIG. 13, a series of data are divided into blocks, and the first-eighth blocks are recorded on the optical disks ①-⑧, and check symbols P, Q, R and S of an error correction code of a hamming distance of 5 are recorded on the optical disks ⑨-⑫. Similarly, the ninth-sixteenth blocks are recorded in the next area of each of the optical disks ①-⑧, and the check symbols P-S thereof are recorded in the next area of each of the optical disks ⑨-⑫.

P, Q, R and S, that is, $a_9$, $a_{10}$, $a_{11}$ and $a_{12}$ are data meeting the following conditions.

$$\sum_{i=1}^{12} a_i = 0$$

$$\sum_{i=1}^{12} \alpha_i a_i = 0$$

$$\sum_{i=1}^{12} (\alpha_i)^2 a_i = 0$$

$$\sum_{i=1}^{12} (\alpha_i)^3 a_i = 0$$

Since $a_1$-$a_8$ are known data, $a_9$, $a_{10}$, $a_{11}$ and $a_{12}$ can be evaluated from four sums.

Figure 14:
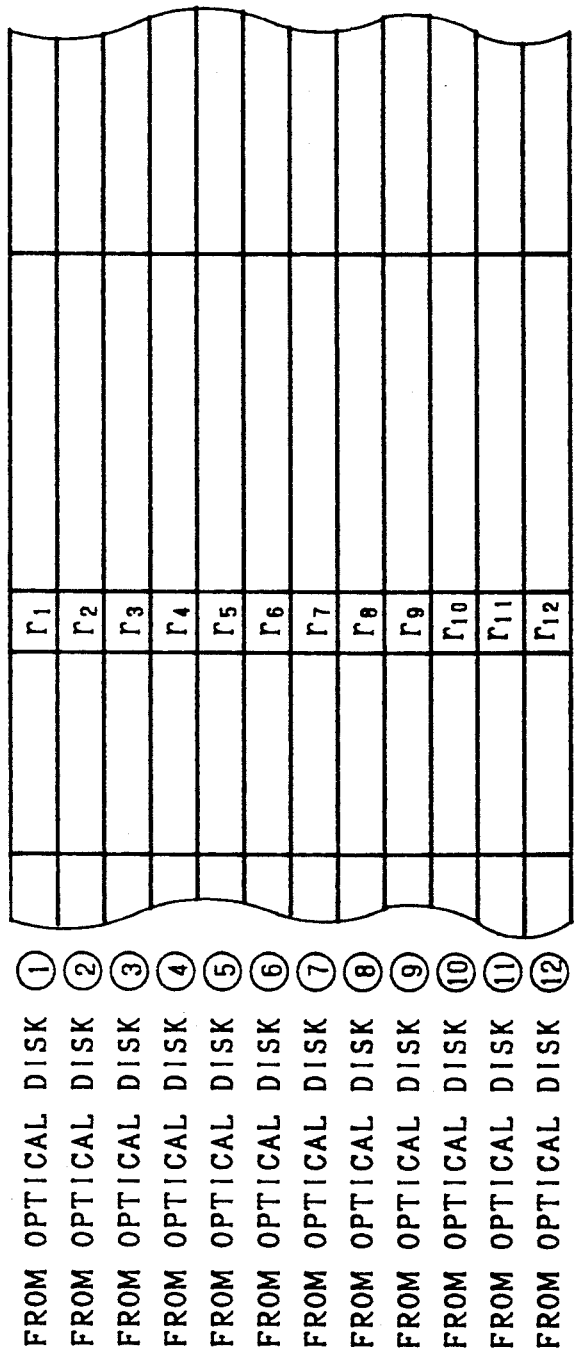
FIG. 14 is an explanatory drawing of reproduced data.

Next, for reproduction, as shown in FIG. 14, syndromes $S_0$, $S_1$, $S_2$ and $S_3$ are calculated for the data $r_1$-$r_{12}$ obtained from the optical disks.

$$S_0 = \sum_{i=1}^{12} r_i$$

$$S_1 = \sum_{i=1}^{12} \alpha_i r_i$$

$$S_2 = \sum_{i=1}^{12} (\alpha_i)^2 r_i$$

$$S_3 = \sum_{i=1}^{12} (\alpha_i)^3 r_i$$

Where no error exists, $r_i = a_i$ holds, therefore $S_0 = S_1 = S_2 = S_3 = 0$ holds, but, for example, if errors exist in disks ⓙ and ⓚ, the following equations hold.

$$S_0 = e_j + e_k$$

$$S_1 = \alpha_j e_j + \alpha_K e_K$$

$$S_2 = (\alpha_j)^2 e_j + (\alpha_K)^2 e_K$$

$$S_3 = (\alpha_j)^3 e_j + (\alpha_K)^3 e_K$$

Four relational formulas exist for four unknown quantities $e_j$, $e_k$, $\alpha_j$ and $\alpha_k$, and therefore they can be solved using the well known algorithm. Thereby, identification and error correction of j and k are made possible.

This means that, unlike the embodiment in FIG. 1, where check symbols of a hamming distances of 5 are recorded on four optical disks, troubles of two optical disks or two optical disk drives can be accommodated for, and where an error pointer or an erasure are provided, or the troubled optical disk is identified, troubles of three optical disks can be accommodated for.

Figure 15A:
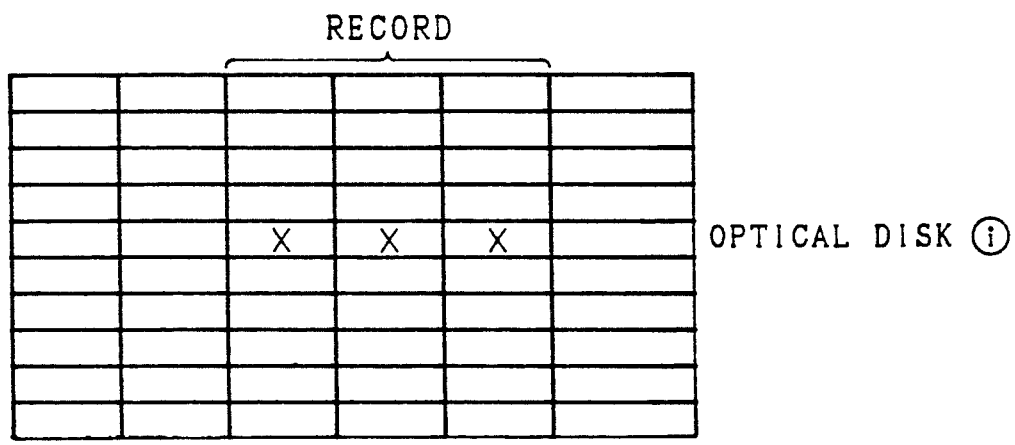
FIG. 15a and 15b show an explanatory drawing of the case of double defects.

Furthermore, in accordance with an embodiment of n=5, the following advantages are obtained. First, as shown in FIG. 15(a), where the disk drive of the optical disk ⓘ goes wrong at the a-th access and the recording thereof is not performed across three sectors (shown by marks ×), in either case of n=3, or n=5, by performing reproduction including these sectors at accesses following the a-th access, an error of data of the appropriate sector is detected, and accordingly, that error can be corrected.

Figure 15B:
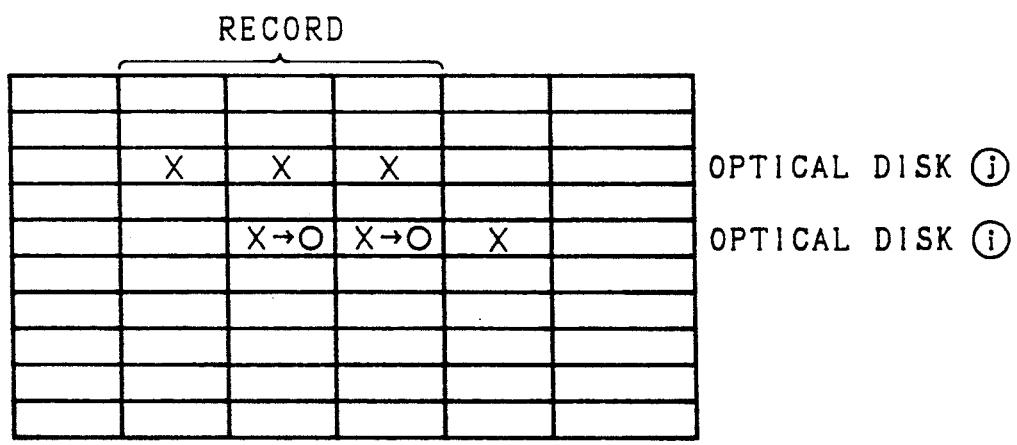

However, as shown in FIG. 15(b), at the b-th access to the same sector in the state that such a correction is not performed, when the disk drive loading of the other disk ⓙ fails, errors are generated in both of the optical disks ⓘ and ⓙ in the embodiment of n=3, and these errors exceed the data correcting ability, and cannot be corrected. On the other hand, in the embodiment of n=5, if the disk drive of the optical disk ⓘ is restored, the errors of the optical disks ⓘ and ⓙ can be detected by reproducing the appropriate sectors, and accordingly, the error of the disk ⓘ can be corrected by the restored optical disk drive, and subsequently, by restoring the disk drive loaded the optical disk ⓙ, this error disk can be corrected also.

Then, where re-write of any data block is needed in the system of the present invention, three units (the embodiment in FIG. 1) or five units (the embodiment in FIG. 12) of the optical disk drive that are loaded with the optical disks that recorded the data block which are to be rewritten and the optical disk drives that are loaded with the optical disks recording check symbols are driven, and only re-write of these optical disks is performed. This means that the recorded data to be re-written is detected from the objective address of the optical disk to be re-written, and the check symbols are detected from the corresponding address of the optical disks for check symbols, and new check symbols are calculated from these. The data to be recorded anew, and the calculated check symbols are recorded at the original positions, and the renewed data is recorded at the address to be rewritten.

In the example in FIG. 6 and FIG. 7, each data is separated and recorded on the eight optical disk in a unit of byte, but can be recorded on separate optical disks in a unit of sector (760 bytes).

Figure 16A:
FIG. 16a and 16b show an explanatory drawing of another data separating and recording system.
Figure 16B:
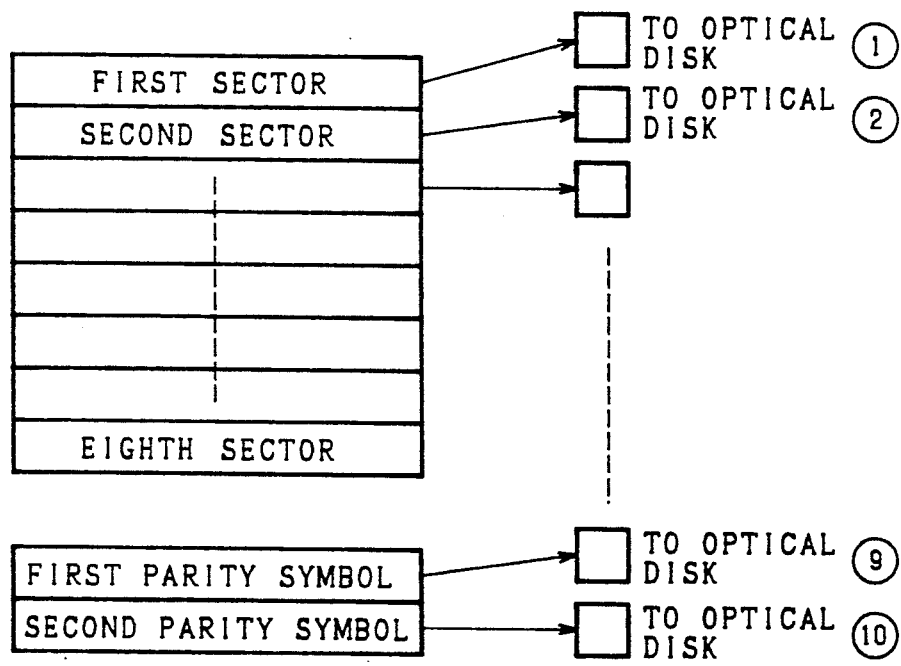

FIG. 16 is an explanatory drawing thereof. As shown in FIG. 16(b), the first parity symbol and the second parity symbol are made by arranging data from the first sector to the eighth sector as shown in FIG. 16(a). Where the error correction code to be used is, for example, GF ($2^8$), the data of the first byte of the parity symbol sector is generated by combining the first bytes of the respective sectors. The parity symbol is likewise generated for the subsequent bytes. The data from the first sector to the eighth sector and the first and the second parity symbols are recorded on the optical disks ①-⑩.

Then, in the record, when the address method of recording in the same address of each disk is adopted, recording and reproduction can be controlled simply. However, when part of the master disk of the optical disk or the stamper is defective, and replicas made therefrom are mixed in a plural number (two or more in the case of n=3), the defect is generated at the same physical address, and correct data reproduction cannot be performed.

To eliminate such a possibility, the recording system as shown in FIG. 8 has only to be adopted.

FIG. 17 is a schematic diagram showing the recording areas of the optical disks ①-⑩. The data interleaved by the method as shown in FIG. 6 and the check symbols thereof are recorded at different physical addresses of the respective optical disks. This can also be performed by physically shifting the driving positions of the optical disks in the optical disk drives 11, 12 . . . 20. For example, the rotary phase has only to be shifted sequentially by one sector for each optical disk drive. The number of sectors to be shifted is not limited to one.

In an alternative method of the present invention, it is also possible that the rotary phase in the optical disk drive is left intact, and the recording time is delayed in sequence by a time required for rotation of one sector. In addition, the delay time is not limited to the time for rotation of one sector, but the delay time may be the time required for rotation of a plurality of sectors.

The present invention can implement recording in a manner that the tracks and sectors of each optical disk are made quite different, or selected independently, but address control is complicated. The use of the method as described above has an advantage of easy control due to common use of the write track, association of the write sector and the like.

Furthermore, the use of the first method makes simultaneous recording possible, and therefore the time required for recording is reduced that much. Data may be read simultaneously from all of the optical disks, and arrangement of data is facilitated.

In addition, timing control of recording and reproduction (in the case of using the second method) has only to be performed by a controlling apparatus 2.

Figure 18:
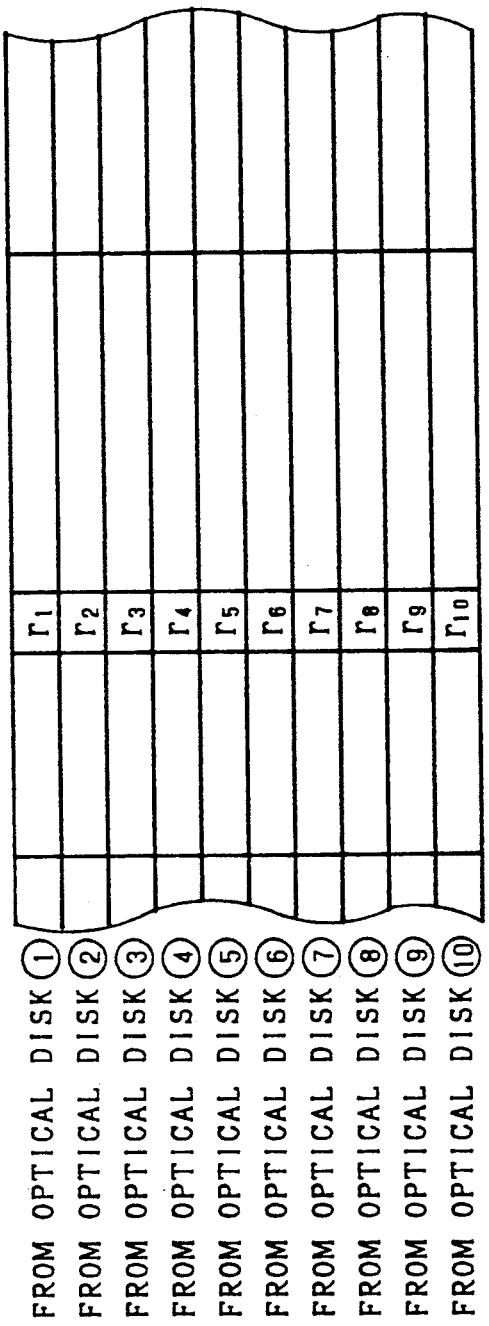
FIG. 18 is an explanatory drawing of reproduced data.

FIG. 18 shows a relation among the reproduced data $r_1, r_2 \ldots r_9, r_{10}$ in the case of recording as shown in FIG. 17, and the syndromes $S_0$ and $S_1$ are calculated like the above-described case using these data.

As described above, in accordance with the present invention, the system can be operated without trouble even if any optical disk is loaded in any disk drive.

By using the system of recording check symbols of error correct code on specific optical disks, data of an optical disk can be restored even when the optical disk is lost or a defect is generated in part of the data.

Recording onto the alternate sector and the alternate track can be omitted, and therefore an advantage is obtainable that the recording speed and the reproducing speed of data can be improved.

Furthermore, in accordance with the present invention, when a large number of errors are generated to the extent that the errors cannot be corrected by the error correct code, it can be detected by the above-described $P_1$, $P_2$ or P, Q, R and S that errors exceeding the correcting ability have been generated in the optical disk drive loaded within the optical disk, and this can be used as erasure information.

Then, in re-writing the recorded data, the number of the optical disk drives required to be driven can be minimal, and therefore the rate of faults of the optical disk drive is reduced, and the reliability of the system is improved.

Then, where scatter-record is made at the physical address, impossibility of data reproduction due to a defect of the master disk of the optical disk or the stamper can be eliminated.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. In an optical recording system having a plurality of optical disk drives, wherein each optical disk drive is loaded with a respective optical disk, and each optical disk having a like sequence of physical addresses an optical recording method, comprising the steps of:

recording a first piece of data in a set of data on a first physical address of an optical disk of a first optical disk drive;

recording each subsequent piece of data in the set of data on a next sequential physical address, on a successive optical disk drive, in accordance with a predetermined sequence of physical addresses and optical disk drives.

2. An optical recording method in accordance with claim 1, wherein the rotary phase of each optical disk drive is sequentially shifted by at least one physical address.

3. An optical recording method in accordance with claim 1, wherein the time between recording performed by each optical disk drive is delayed by a sufficient time for rotation of a predetermined number of physical addresses of an optical disk.

* * * * *